(12) United States Patent
Marchand et al.

(10) Patent No.: US 12,486,783 B2
(45) Date of Patent: Dec. 2, 2025

(54) SYSTEMS AND METHODS FOR IDENTIFYING A CONDITION OF GAS TURBINE ENGINE SEALS

(71) Applicant: Pratt & Whitney Canada Corp., Longueuil (CA)

(72) Inventors: Nicolas Marchand, St-Bruno (CA); Velda Wong, Toronto (CA); Ehsan Farvardin, Longueuil (CA); Benoit Trudel, Montreal (CA); Sri Krishna Subramanian, Mississauga (CA); Gabriel St-Laurent, Longueuil (CA); Benjamin Z. Seaman, Pooler, GA (US)

(73) Assignee: Pratt & Whitney Canada Corp., Longueuil (CA)

( * ) Notice: Subject to any disclaimer, the term of this patent is extended or adjusted under 35 U.S.C. 154(b) by 465 days.

(21) Appl. No.: 17/959,851

(22) Filed: Oct. 4, 2022

(65) Prior Publication Data

US 2024/0110489 A1    Apr. 4, 2024

(51) Int. Cl.
  *G01M 3/26* (2006.01)
  *F01D 21/00* (2006.01)
  *G01M 15/14* (2006.01)
  *G07C 5/00* (2006.01)

(52) U.S. Cl.
  CPC ............. *F01D 21/003* (2013.01); *G01M 3/26* (2013.01); *G01M 15/14* (2013.01); *G07C 5/008* (2013.01); *F05D 2260/83* (2013.01)

(58) Field of Classification Search
  CPC ........ F01D 21/003; F01D 25/12; F01D 25/14; F01D 25/183; F01D 9/06; F01D 9/065; G01M 3/26; G01M 15/14
  See application file for complete search history.

(56) References Cited

U.S. PATENT DOCUMENTS

| | | |
|---|---|---|
| 6,799,112 B1 | 9/2004 | Carter |
| 9,279,341 B2 * | 3/2016 | Durocher ................ F01D 11/04 |
| 10,309,308 B2 * | 6/2019 | Cherolis ................. F01D 9/065 |
| 11,466,590 B1 * | 10/2022 | St-Laurent ............... F02C 6/08 |

(Continued)

FOREIGN PATENT DOCUMENTS

WO    2021213597 A1    10/2021

OTHER PUBLICATIONS

EP Search Report for EP Patent Application No. 23201702.0 dated Oct. 22, 2024.

*Primary Examiner* — Nathaniel E Wiehe
*Assistant Examiner* — Maxime M Adjagbe
(74) *Attorney, Agent, or Firm* — Getz Balich LLC

(57) ABSTRACT

An assembly for an aircraft propulsion system includes a case assembly, at least one seal, a first pressure sensor, and a computing system. The case assembly forms a cavity. The at least one seal is disposed on the case assembly. The at least one seal is configured to seal the cavity. The first pressure sensor is in fluid communication with the cavity. The first pressure sensor is configured to measure a first pressure within the cavity. The computing system is in signal communication with the first pressure sensor. The computing system includes a processor in communication with a non-transitory memory storing instructions, which instructions when executed by the processor, cause the processor to compare the first pressure to a pressure threshold value to identify a wear condition of the at least one seal.

20 Claims, 5 Drawing Sheets

(56) References Cited

U.S. PATENT DOCUMENTS

| | | |
|---|---|---|
| 2007/0212212 A1 | 9/2007 | Luttenberg |
| 2012/0036823 A1 | 2/2012 | Furman |
| 2016/0167792 A1* | 6/2016 | Greenberg ............. B64D 15/20 415/116 |
| 2017/0204737 A1 | 7/2017 | Varney |
| 2018/0080389 A1* | 3/2018 | Schwarz ................. F02C 7/185 |
| 2019/0277676 A1* | 9/2019 | Koenig ..................... F02C 7/18 |
| 2021/0042183 A1* | 2/2021 | Adamski ............. G06F 11/0736 |
| 2022/0090513 A1 | 3/2022 | Lizzer |
| 2023/0228231 A1* | 7/2023 | Miller ...................... F02C 6/08 |

* cited by examiner

SYSTEMS AND METHODS FOR IDENTIFYING A CONDITION OF GAS TURBINE ENGINE SEALS

TECHNICAL FIELD

This disclosure relates generally to gas turbine engine seals and, more particularly, to systems and methods for identifying a condition of seals.

BACKGROUND OF THE ART

Gas turbine engines may include numerous cavities isolated by one or more seals. During operation of the gas turbine engine, seals may experience varying levels of wear which may degrade the performance of the seals. Various systems and methods are known in the art for identifying seal conditions. While these known systems and methods have various advantages, there is still room in the art for improvement.

SUMMARY

It should be understood that any or all of the features or embodiments described herein can be used or combined in any combination with each and every other feature or embodiment described herein unless expressly noted otherwise.

According to an aspect of the present disclosure, an assembly for a propulsion system of an aircraft includes a case assembly, at least one seal, a first pressure sensor, and a computing system. The case assembly forms a cavity. The at least one seal is disposed on the case assembly. The at least one seal is configured to seal the cavity. The first pressure sensor is in fluid communication with the cavity. The first pressure sensor is configured to measure a first pressure within the cavity. The computing system is in signal communication with the first pressure sensor. The computing system includes a processor in communication with a non-transitory memory storing instructions, which instructions when executed by the processor, cause the processor to compare the first pressure to a pressure threshold value to identify a wear condition of the at least one seal.

In any of the aspects or embodiments described above and herein, the assembly may further include a pressurized air source and a second pressure sensor. The pressurized air source may be configured to direct pressurized air into the cavity. The second pressure sensor may be in fluid communication with the pressurized air source and configured to measure a second pressure of the pressurized air. The computing system may be in signal communication with the second pressure sensor. The instructions, when executed by the processor, may further cause the processor to determine the pressure threshold value based on the second pressure.

In any of the aspects or embodiments described above and herein, the computing system may include an engine control system in signal communication with the first pressure sensor and the second pressure sensor.

In any of the aspects or embodiments described above and herein, the computing system may include a remote system in communication with the engine control system. The remote system may be disposed outside of the aircraft. The remote system may include the processor and the non-transitory memory.

According to another aspect of the present disclosure, a method for identifying a wear condition of at least one seal for a gas turbine engine of a propulsion system of an aircraft includes: measuring a first pressure within a cavity sealed by the at least one seal, directing pressurized air into the cavity with a pressurized air source, measuring a second pressure of the pressurized air source, determining a pressure threshold value based on the second pressure, and identifying a wear condition of the at least one seal by comparing the first pressure to the pressure threshold value.

In any of the aspects or embodiments described above and herein, the step of identifying the wear condition may be performed with the propulsion system in an on-wing condition.

In any of the aspects or embodiments described above and herein, the steps of determining the pressure threshold value and identifying the wear condition of the at least one seal may be performed by a remote system outside the aircraft.

In any of the aspects or embodiments described above and herein, the method may further include monitoring a rotational speed of a shaft of the gas turbine engine to identify a steady state condition of the gas turbine engine prior to the steps of measuring the first pressure and measuring the second pressure.

In any of the aspects or embodiments described above and herein, the cavity may be formed by a case assembly of the gas turbine engine. The method may further include installing a borescope plug in the case assembly with the borescope plug in fluid communication with the cavity. The borescope plug may be fluidly coupled to a pressure sensor. The first pressure may be measured by the pressure sensor.

In any of the aspects or embodiments described above and herein, the method may further include establishing a predetermined operational power level of the gas turbine engine prior to the steps of measuring the first pressure and measuring the second pressure. The pressure threshold value may be further based on the predetermined operational power level.

According to another aspect of the present disclosure, an assembly for a propulsion system of an aircraft includes a high-pressure turbine, a low-pressure turbine, a mid-turbine frame, a pressurized air source, and a first pressure sensor. The high-pressure turbine forms a core flow path. The low-pressure turbine further forms the core flow path. The low-pressure turbine is disposed downstream of the high-pressure turbine. The mid-turbine frame is disposed between the high-pressure turbine and the low-pressure turbine. The mid-turbine frame includes an outer case, an inner case, an inter-turbine duct, and a plurality of frame seals. The outer case, the inner case, the inter-turbine duct, and the plurality of frame seals form a mid-turbine frame cavity of the mid-turbine frame. The plurality of frame seals are configured to seal the mid-turbine frame cavity. The inter-turbine duct further forms the core flow path. The pressurized air source is fluid coupled to the mid-turbine frame. The pressurized air source is configured to direct pressurized air into the mid-turbine frame cavity. The first pressure sensor is in fluid communication with the mid-turbine frame cavity. The first pressure sensor is configured to measure a first pressure within the mid-turbine frame cavity.

In any of the aspects or embodiments described above and herein, the assembly may further include a high-pressure compressor further forming the core flow path. The pressurized air source may include the high-pressure compressor.

In any of the aspects or embodiments described above and herein, the pressurized air source may be disposed outside the propulsion system.

In any of the aspects or embodiments described above and herein, the assembly may further include a second pressure sensor configured to measure a second pressure of the pressurized air.

In any of the aspects or embodiments described above and herein, the assembly may further include an engine control system. The engine control system may be in communication with the first sensor and the second sensor.

In any of the aspects or embodiments described above and herein, the assembly may further include a remote system. The remote system may be disposed outside of the aircraft. The engine control system may be configured to transmit the first pressure and the second pressure to the remote system.

In any of the aspects or embodiments described above and herein, the remote system may include a processor in communication with a non-transitory memory storing instructions, which instructions when executed by the processor, may cause the processor to: determine a pressure threshold value based on the second pressure and compare the first pressure to the pressure threshold value to identify a wear condition of the plurality of frame seals.

In any of the aspects or embodiments described above and herein, the outer case may include a borescope port. The assembly may further include a borescope plug installed in the borescope port. The borescope plug may form an internal passage in fluid communication with the mid-turbine frame cavity. The first sensor may be disposed outside the mid-turbine frame cavity and fluidly coupled to the internal passage to measure the first pressure within the mid-turbine frame cavity.

In any of the aspects or embodiments described above and herein, the inter-turbine duct may include an outer duct wall, an inner duct wall, and a plurality of hollow struts extending from the outer duct wall to the inner duct wall. The outer duct wall, the inner duct wall, and the plurality of hollow struts may further form the mid-turbine frame cavity.

In any of the aspects or embodiments described above and herein, the mid-turbine frame may be configured to direct the pressurized air from the mid-turbine frame cavity to the low-pressure turbine.

The present disclosure, and all its aspects, embodiments and advantages associated therewith will become more readily apparent in view of the detailed description provided below, including the accompanying drawings.

DETAILED DESCRIPTION

Figure 1:
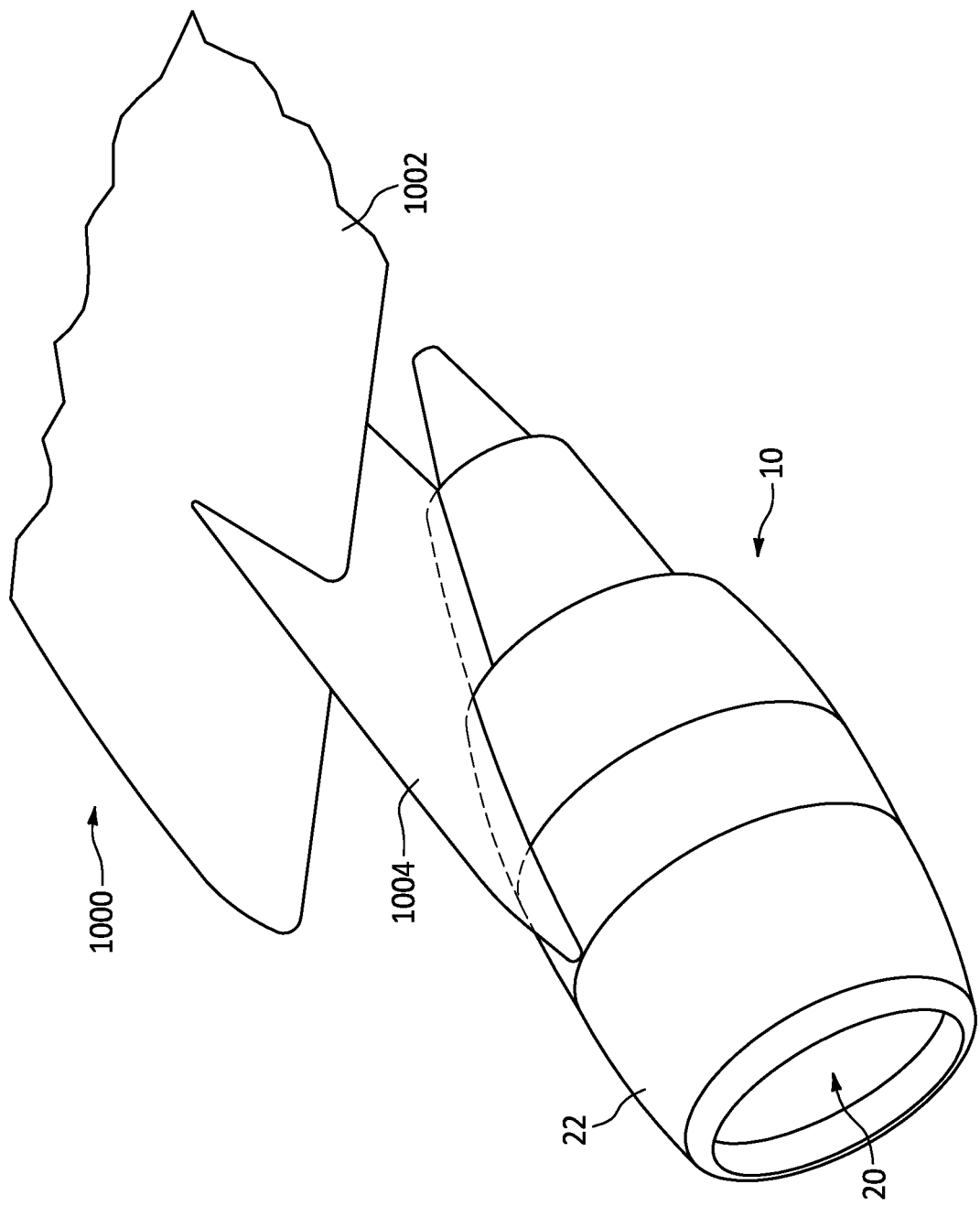
FIG. 1 illustrates a perspective view of a propulsion system for an aircraft, in accordance with one or more embodiments of the present disclosure.
Figure 2:
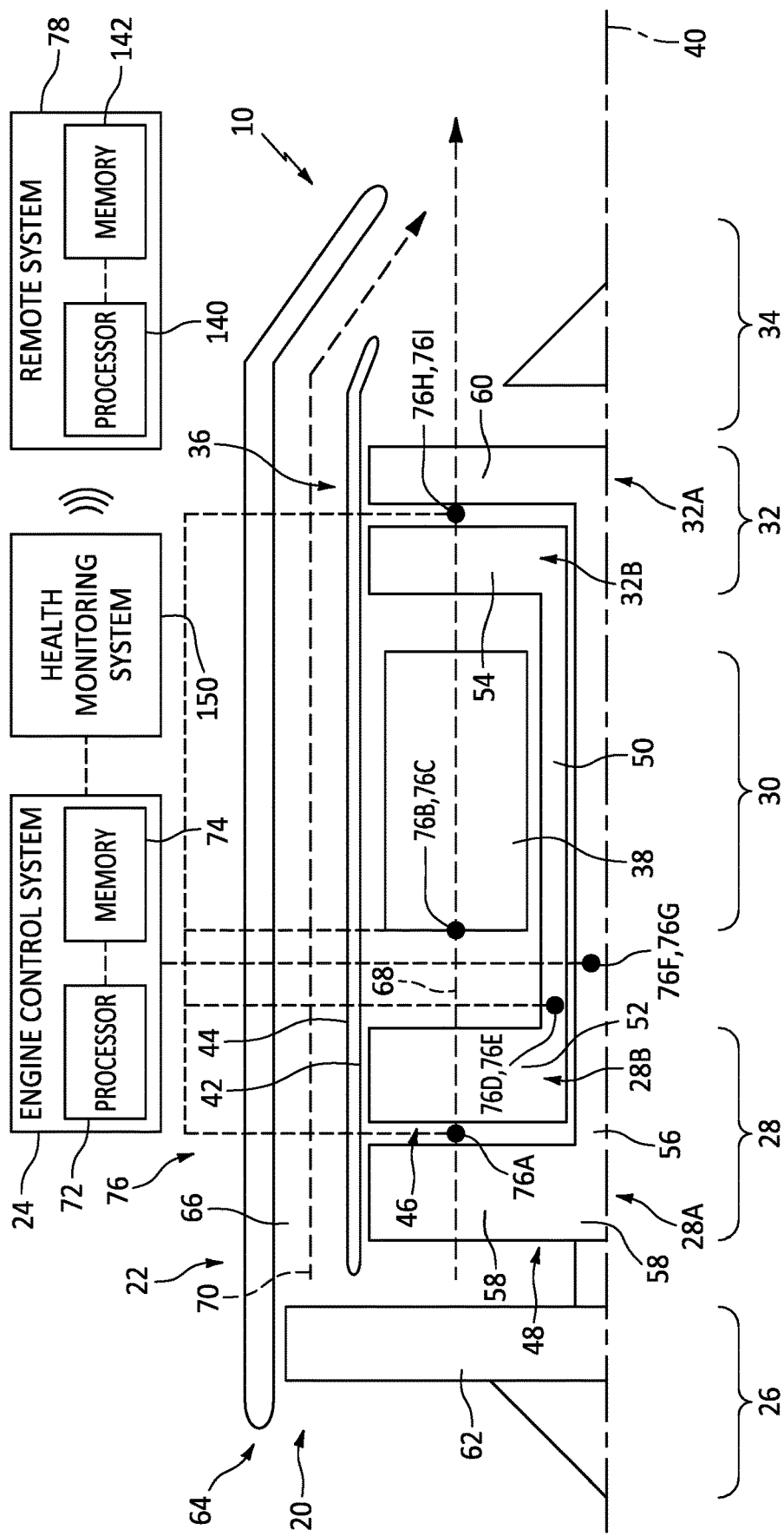
FIG. 2 illustrates a schematic view of the propulsion system of FIG. 1, in accordance with one or more embodiments of the present disclosure.

FIGS. 1 and 2 illustrate a propulsion system 10 for an aircraft 1000. The aircraft propulsion system 10 includes a gas turbine engine 20, a nacelle 22 (e.g., an aircraft propulsion system housing), and an engine control system 24. The propulsion system 10 (e.g., the nacelle 22) may be mounted to or otherwise formed by a portion of the aircraft 1000 such as, but not limited to, a wing or fuselage of the aircraft 1000. The propulsion system 10 of FIG. 1, for example, is mounted to a wing 1002 of the aircraft 1000 by a pylon 1004.

FIG. 2 illustrates a schematic view of the propulsion system 10. The gas turbine engine 20 of FIG. 2 is configured as a turbofan engine. However, the present disclosure is not limited to any particular configuration of gas turbine engine for the propulsion assembly 10, and examples of gas turbine engine configurations for the propulsion system 10 may include, but are not limited to, a turboprop engine, a turbojet engine, a propfan engine, or the like. The gas turbine engine 20 of FIG. 2, for example, includes a fan section 26, a compressor section 28, a combustor section 30, a turbine section 32, an exhaust section 34, and an engine static structure 36. The compressor section 28 may include a low-pressure compressor (LPC) 28A and a high-pressure compressor (HPC) 28B. The combustor section 28 includes a combustor 38. The turbine section 32 may include a low-pressure turbine (LPT) 32A and a high-pressure turbine (HPT) 32B.

The gas turbine engine 20 sections 28, 30, 32, and 34 of FIG. 2 are arranged sequentially along an axial centerline 40 (e.g., a rotational axis) of the propulsion system 10 within the engine static structure 36. The engine static structure 34 may include, for example, one or more engine cases 42 and a core cowl 44. The one or more engine cases 42 house and/or structurally support one or more of the engine sections 28, 30, 32, and 34, which engine sections 28, 30, 32, and 34 may be collectively referred to as an "engine core." The core cowl 44 houses and provides an aerodynamic cover for the engine core.

The gas turbine engine 20 of FIG. 2 further includes a first rotational assembly 46 (e.g., a high-pressure spool) and a second rotational assembly 48 (e.g., a low-pressure spool). The first rotational assembly 46 and the second rotational assembly 48 are mounted for rotation about the axial centerline 40 relative to the engine static structure 36.

The first rotational assembly 46 includes a first shaft 50, a bladed first compressor rotor 52, and a bladed first turbine rotor 54. The first shaft 50 interconnects the bladed first compressor rotor 52 and the bladed first turbine rotor 54. The second rotational assembly 48 includes a second shaft 56, a bladed second compressor rotor 58, a bladed second turbine rotor 60, and a bladed fan 62. The second shaft 56 interconnects the bladed second compressor rotor 58, the bladed second turbine rotor 60, and the bladed fan 62. The second shaft 56 may be connected to the bladed fan 62, for example, by one or more speed-reducing gear assemblies (not shown) to drive the bladed fan 62 at a reduced rotational speed relative to the second shaft 56. The combustor 38 of FIG. 2 is disposed between the bladed first compressor rotor 52 and the bladed first turbine rotor 54 along the axial centerline 40.

The nacelle 22 houses the gas turbine engine 20 and forms and aerodynamic cover for the propulsion system 10. The nacelle 22 of FIG. 2 extends circumferentially about (e.g., completely around) the axial centerline 40. The nacelle 22 forms an air inlet 64 of the propulsion system 10 at an upstream end of the nacelle 22. The nacelle 22 is radially spaced from the gas turbine engine 20 (e.g., the core cowl 44) to form an annular bypass duct 66 extending axially through the propulsion system 10.

During operation of the propulsion system 10 of FIG. 2, air enters the propulsion system 10 through the air inlet 64 and is directed into a core flow path 68 and a bypass flow path 70 by the bladed fan 62. The core flow path 68 extends axially along the axial centerline 40 within the gas turbine engine 20. More particularly, the core flow path 68 extends axially through the gas turbine engine 20 sections 26, 28, 30, 32, and 34 of FIG. 2. The air within the core flow path 68 may be referred to as "core air." The core air is compressed by the bladed second compressor rotor 58 and the bladed first compressor rotor 52 and directed into a combustion chamber of the combustor 38. Fuel is injected into the combustion chamber and mixed with the compressed core air to provide a fuel-air mixture. This fuel-air mixture is ignited and combustion products thereof, which may be referred to as "core combustion gas," flow through and sequentially cause the bladed first turbine rotor 54 and the bladed second turbine rotor 60 to rotate. The rotation of the bladed first turbine rotor 54 and the bladed second turbine rotor 60 respectively drive rotation of the first rotational assembly 46 and the second rotational assembly 48. The bypass flow path 70 extends through the bypass duct 66 axially along the axially centerline 40 to the exhaust section 34. The air within the bypass flow path 70 may be referred to as "bypass air." The aircraft propulsion system 10 of the present disclosure, however, is not limited to the exemplary gas turbine engine configuration described above and illustrated in FIG. 2.

The engine control system 24 of FIG. 2 includes a processor 72 and memory 74. The memory 74 is in signal communication with the processor 72. The processor 72 may include any type of computing device, computational circuit, or any type of process or processing circuit capable of executing a series of instructions that are stored in the memory 74, thereby causing the processor 72 to perform or control one or more steps or other processes. The processor 72 may include multiple processors and/or multicore CPUs and may include any type of processor, such as a microprocessor, digital signal processor, co-processors, a microcontroller, a microcomputer, a central processing unit, a field programmable gate array, a programmable logic device, a state machine, logic circuitry, analog circuitry, digital circuitry, etc., and any combination thereof. The instructions stored in memory 74 may represent one or more algorithms for controlling aspects of the propulsion system 10, and the stored instructions are not limited to any particular form (e.g., program files, system data, buffers, drivers, utilities, system programs, etc.) provided they can be executed by the processor 72. The memory 74 may be a non-transitory computer readable storage medium configured to store instructions that when executed by one or more processors, cause the one or more processors to perform or cause the performance of certain functions. The memory 74 may be a single memory device or a plurality of memory devices. A memory device may include a storage area network, network attached storage, as well a disk drive, a read-only memory, random access memory, volatile memory, non-volatile memory, static memory, dynamic memory, flash memory, cache memory, and/or any device that stores digital information. One skilled in the art will appreciate, based on a review of this disclosure, that the implementation of the engine control system 24 may be achieved via the use of hardware, software, firmware, or any combination thereof. The engine control system 24 may also include input and output devices (e.g., keyboards, buttons, switches, touch screens, video monitors, sensor readouts, data ports, etc.) that enable the operator to input instructions, receive data, etc. The engine control system 24 may be located within the propulsion system 10 or may be located on the aircraft 1000 on which the propulsion system 10 is installed (see FIG. 1).

The engine control system 24 may form or otherwise be part of an electronic engine controller (EEC) for the propulsion system 10. The EEC may control operating parameters of the gas turbine engine 20 including, but not limited to, fuel flow, stator vane position, compressor air bleed valve position, etc. so as to control an engine power and/or thrust of the gas turbine engine 20. In some embodiments, the EEC may be part of a full authority digital engine control (FADEC) system for the propulsion system 10.

The engine control system 24 may be configured to receive data associated with operation of the gas turbine engine 20. The data may include operational parameters (e.g., pressure, temperature, fuel flow, rotation speed, torque, etc.) for the gas turbine engine 20. The engine control system 24 may include and be in communication (e.g., signal communication) with one or more sensors 76 distributed throughout the gas turbine engine 20. The sensors may include, but are not limited to, one or more of the following exemplary sensors: one or more pressure sensors 76A for the compressor section 28 configured to measure a pressure at an inlet, an outlet, and/or one or more intermediate stages of the low-pressure compressor 28A and/or the high-pressure compressor 28B; a fuel flow sensor 76B; a fuel pressure sensor 76C; a rotation speed sensor 76D for the first shaft 50; a torque sensor 76E for the first shaft 50; a rotation speed sensor 76F for the second shaft 56; a torque sensor 76G for the second shaft 56; one or more temperature sensors 76H for the turbine section 32 configured to measure a temperature at an inlet and/or an outlet of the low-pressure turbine 32A and/or the high-pressure turbine 32B; and/or one or more pressure sensors 76I for the turbine section 32 configured to measure a pressure at an inlet and/or an outlet of the low-pressure turbine 32A and/or the high-pressure turbine 32B and/or one or more cavities formed within the turbine section 32.

The engine control system 24 may be configured for direct or indirect wireless communication with one or more remote systems 78 (e.g., offboard computer systems external to the propulsion system 10 and the associated aircraft 1000). The engine control system 24 may transmit operational data collected from the propulsion system 10 (e.g., from the sensors 76) to the remote systems 78 for remote monitoring and/or analysis of propulsion system 10 health. For example, the remote systems 78 may allow maintenance personnel to remotely monitor and/or analyze the health of the propulsion system 10. The remote systems 78 may include, for example, a ground station, a near-wing maintenance computer, and/or any other device with which the engine control system 24 may establish one-way or two-way wireless communication.

Additionally or alternatively, the engine control system 24 may be in communication (e.g., signal communication with a health monitoring system 150 of the aircraft 1000 (see FIG. 1). Signal communication between the engine control system 24 and the health monitoring system 150 may be accomplished using any suitable wired or wireless communication system. The engine control system 24 may be configured to transmit operational data collected from the propulsion system 10 to the aircraft health monitoring system 150. For aircraft having multiple propulsion systems, such as the propulsion system 10, the aircraft health monitoring system 150 may be configured to receive and monitor operational data transmitted from each propulsion system. The aircraft health monitoring system 150 may be configured for direct or indirect wireless communication with the one or more remote systems 78 to transmit propulsion system operational data, as previously described. Wireless communication may be implemented by a variety of technologies such as, but not limited to, Wi-Fi (e.g., radio wireless local area networking based on IEEE 802.11 or other applicable standards), cellular networks, satellite communication, and/or other wireless communication technologies known in the art. Wireless communication between the engine control system 24 and the remote systems 78 may be direct or indirect. It should be understood, of course, that wired communication systems may be used in addition to or as an alternative to wireless communication systems.

The remote system 78 of FIG. 2 includes a processor 140 and memory 142. The memory 142 is in signal communication with the processor 140. The processor 140 may include any type of computing device, computational circuit, or any type of process or processing circuit capable of executing a series of instructions that are stored in the memory 142, thereby causing the processor 140 to perform or control one or more steps or other processes. The processor 140 may include multiple processors and/or multicore CPUs and may include any type of processor, such as a microprocessor, digital signal processor, co-processors, a micro-controller, a microcomputer, a central processing unit, a field programmable gate array, a programmable logic device, a state machine, logic circuitry, analog circuitry, digital circuitry, etc., and any combination thereof. The instructions stored in memory 142 may represent one or more algorithms for monitoring and/or analyzing operational data transmitted to the remote system 78 by the engine control system 24, and the stored instructions are not limited to any particular form (e.g., program files, system data, buffers, drivers, utilities, system programs, etc.) provided they can be executed by the processor 140. The memory 142 may be a non-transitory computer readable storage medium configured to store instructions that when executed by one or more processors, cause the one or more processors to perform or cause the performance of certain functions. The memory 142 may be a single memory device or a plurality of memory devices. A memory device may include a storage area network, network attached storage, as well a disk drive, a read-only memory, random access memory, volatile memory, non-volatile memory, static memory, dynamic memory, flash memory, cache memory, and/or any device that stores digital information. One skilled in the art will appreciate, based on a review of this disclosure, that the implementation of the remote system 78 may be achieved via the use of hardware, software, firmware, or any combination thereof. The remote system 78 may also include input and output devices (e.g., keyboards, buttons, switches, touch screens, video monitors, sensor readouts, data ports, etc.) that enable the operator to input instructions, receive data, etc.

Figure 3:
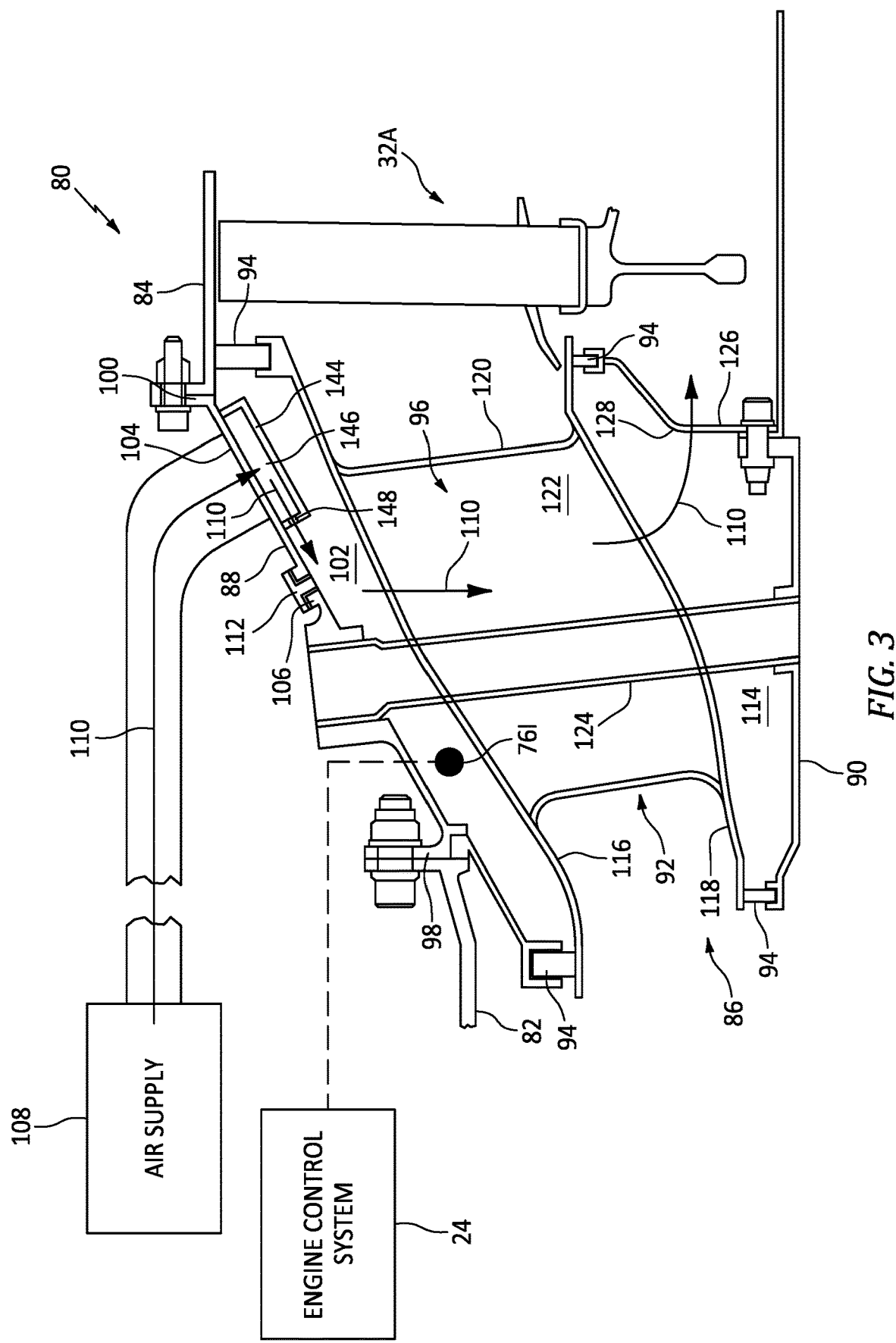
FIG. 3 illustrates a side, cutaway view of a mid-turbine frame, in accordance with one or more embodiments of the present disclosure.

FIG. 3 illustrates a turbine case assembly 80 of the turbine section 32, which turbine case assembly 80 forms a portion of the engine static structure 36 (see FIG. 1). The turbine case assembly 80 includes a high-pressure turbine case 82, a low-pressure turbine case 84, and a mid-turbine frame 86. The high-pressure turbine case 82 surrounds and houses the high-pressure turbine 32B (see FIG. 1). Similarly, the low-pressure turbine case 84 surrounds and houses the low-pressure turbine 32A (see FIG. 2).

The mid-turbine frame 86 includes an outer case 88, an inner case 90, an inter-turbine duct 92, and a plurality of frame seals 94. The outer case 88, the inner case 90, the inter-turbine duct 92, and the plurality of frame seals 94 form a mid-turbine frame cavity 96.

The outer case 88 is configured as an annular case extending between and to a first axial end 98 of the outer case 88 and a second axial end 100 of the outer case 88. The outer case 88 is mounted to the high-pressure turbine case 82 at (e.g., on, adjacent, or proximate) the first axial end 98 (e.g., by a mounting flange). The outer case 88 is mounted to the low-pressure turbine case 84 at (e.g., on, adjacent, or proximate) the second axial end 100 (e.g., by a mounting flange). The outer case 88 forms an annular outer plenum 102 of the mid-turbine frame cavity 96 radially between the outer case 88 and the inter-turbine duct 92.

The outer case 88 of FIG. 3 includes one or more air inlet ports 104 and one or more borescope ports 106. Each air inlet port 104 may be connected (e.g., by one or more conduits) to a source 108 of pressurized air 110 such as, but not limited to, an outlet (e.g., P3.0 air) or an intermediate stage (e.g., P2.8 or P2.9 air) of the high-pressure compressor 28B (see FIG. 2). Alternatively, the pressurized air source 108 may be a source of pressurized air located outside of the propulsion system 10 such as, for example, an air compressor of a test equipment assembly, which test equipment assembly may include a pressure sensor (e.g., a pressure sensor in signal communication with one or both of the engine control system 24 and the remote systems 78) for measuring a pressure of the pressurized air 110. The air inlet ports 104 are configured to direct the pressurized air 110 into the outer plenum 102. In some embodiments, the pressurized air 110 directed into the outer plenum 102 may be further directed into an outer cavity of the low-pressure turbine 32A (e.g., a cavity radially outside the low-pressure turbine case 84) for cooling of the low-pressure turbine 32A. The borescope ports 106 are configured to selectively facilitate access to the mid-turbine frame cavity 96, for example, for inspection and/or cleaning of the mid-turbine frame 86. Each borescope port 106 may include a removable borescope plug 112 configured to seal the borescope port 106, for example, during operation of the gas turbine engine 20.

The mid-turbine frame 86 may include a diffuser 144. The diffuser 144 of FIG. 3 is configured as an annular body mounted to the outer case 88 (e.g., a radially interior surface of the outer case 88). The diffuser 144 is mounted to the outer case 88 at (e.g., on, adjacent, or proximate) the one or more air inlet ports 104. The diffuser 144 forms an annular air channel 146 between the outer case 88 and the diffuser 144. The diffuser 144 also forms a plurality of apertures 148 extending through the diffuser 144 from the annular air channel 146 to the outer plenum 102. The plurality of apertures 148 of FIG. 3 are disposed at an axially forward end of the diffuser 144, however, the present disclosure is not limited to any particular location of the plurality of apertures 148 with respect to the diffuser 144. The plurality of apertures 148 may be circumferentially distributed along the annular body of the diffuser 144 (e.g., about the axial centerline 40 (see FIG. 2)). The diffuser 144 may facilitate even distribution of the pressurized air 110 from the one or more air inlet ports 104 into the outer plenum 102.

The inner case 90 is configured as an annular case concentrically disposed within the outer case 88. The inner case 90 may be connected to the outer case 88 by a plurality of load transfer spokes (not shown) extending radially between the inner case 90 and the outer case 88. The inner case 90 may be mounted to or may otherwise support one or more bearing assemblies (e.g., a bearing, a bearing housing, etc.) for the first shaft 50 and/or the second shaft 56 (see FIG. 2). The load from the one or more bearing assemblies may be transferred to portions of the engine static structure 36 (e.g., the high-pressure turbine case 82 and the low-pressure turbine case 84) by the mid-turbine frame 86 (see FIG. 2). The inner case 90 forms an annular inner plenum 114 of the mid-turbine frame cavity 96 radially between the inner case 90 and the inter-turbine duct 92. The inner plenum 114 may additionally be formed by an annular baffle 126. The baffle 126 of FIG. 3 is mounted to the inner case 90 (e.g., at a mounting flange) and extends radially from the inner case 90 to the inter-turbine duct 92. The baffle 126 is disposed between the inner plenum 114 and the low-pressure turbine 32A (e.g., a rotor cavity of the low-pressure turbine 32A). The baffle 126 may form one or more openings 128 extending through the baffle 126 between the inner plenum 114 and the low-pressure turbine 32A.

The inter-turbine duct 92 includes an outer duct wall 116, an inner duct wall 118, and a plurality of struts 120. An annular portion of the core flow path 68 is formed between (e.g., radially between) the outer duct wall 116 and the inner duct wall 118 to direct core combustion gas through the mid-turbine frame 86 from the high-pressure turbine 32B to the low-pressure turbine 32A (see FIG. 2).

The plurality of struts 120 are configured as an array of circumferentially-spaced struts. Each strut 120 extends radially through the core flow path 68 to contact the outer duct wall 116 and the inner duct wall 118. Each strut 120 may be configured with an airfoil profile for directing core combustion gas to the low-pressure turbine 32A. One or more of the struts 120, such as the strut 120 illustrated in FIG. 3, may be configured as a hollow strut forming an internal passage 122. The internal passage 122 may extend through the outer duct wall 116 and the inner duct wall 118 such that outer plenum 102, the inner plenum 114, and the internal passage 122 are fluidly connected. One or more auxiliary system or other components (e.g., a load transfer spoke) may extend through the internal passage 122 of a respective strut 120. For example, a conduit 124 extend through (e.g., radially through) the strut 120 of FIG. 3, which conduit 124 may be used, for example, to provide lubricant or cooling air to a bearing assembly supported by the inner case 90.

The plurality of frame seals 94 seal the mid-turbine frame cavity 96 from surrounding portions of the gas turbine engine 20 such as, for example, the core flow path 68. The mid-turbine frame 86 of FIG. 3 includes four frame seals 94, of which two frame seals 94 are configured for sealing the outer plenum 102 and two frame seals 94 are configured for sealing the inner plenum 114. The present disclosure, however, is not limited to any particular number or arrangement of the frame seals 94. As shown in FIG. 3, the baffle 126 may retain one of the frame seals 94, which frame seal 94 may be disposed in contact, for example, with the inner duct wall 118. The frame seals 94 may be configured, for example, as piston seal rings or any other suitable seal configuration.

In operation, the pressurized air 110 supplied to the mid-turbine frame 86 by the pressurized air source 108 is directed into the outer plenum 102, through the internal passage 122 of one or more of the struts 120, and into the inner plenum 114. The pressurized air 110 within the inner plenum 114 may subsequently be directed through the openings 128 to provide cooling for components of the low-pressure turbine 32A. The pressurized air 110 directed into the mid-turbine frame cavity 96 may have a greater pressure than the surrounding cavities and/or the core flow path 68, thereby preventing the ingestion of hot gas into the mid-turbine frame cavity 96.

The mid-turbine frame 86 of FIG. 3 further includes one of the pressure sensors 76I, which pressure sensor 76I is configured to measure a pressure (e.g., of the pressurized air 110) within the mid-turbine frame cavity 96. The pressure sensor 76I of FIG. 3 is in signal communication with the engine control system 24. In some embodiments, however, the mid-turbine frame 86 may not include a dedicated sensor (e.g., the pressure sensor 76I) configured for measuring a pressure within the mid-turbine frame cavity 96.

As the gas turbine engine 20 is operated, the frame seals 94 may experience wear, thereby allowing at least some amount of the pressurized air 110 to leak past one or more of the frame seals 94. As a result of this leakage, the amount of pressurized air 110 directed to the low-pressure turbine 32A for cooling may be undesirably reduced. In some cases, excessive wear of mid-turbine frame seals (e.g., the frame seals 94) has been identified based on inspections and/or testing with an associated gas turbine engine in an "off-wing" condition (e.g., with the gas turbine engine removed from an associated aircraft). However, off-wing inspections and/or testing to identify worn mid-turbine frame seals may require expensive and time-consuming maintenance operations and may also limit aircraft operational time.

Figure 4:
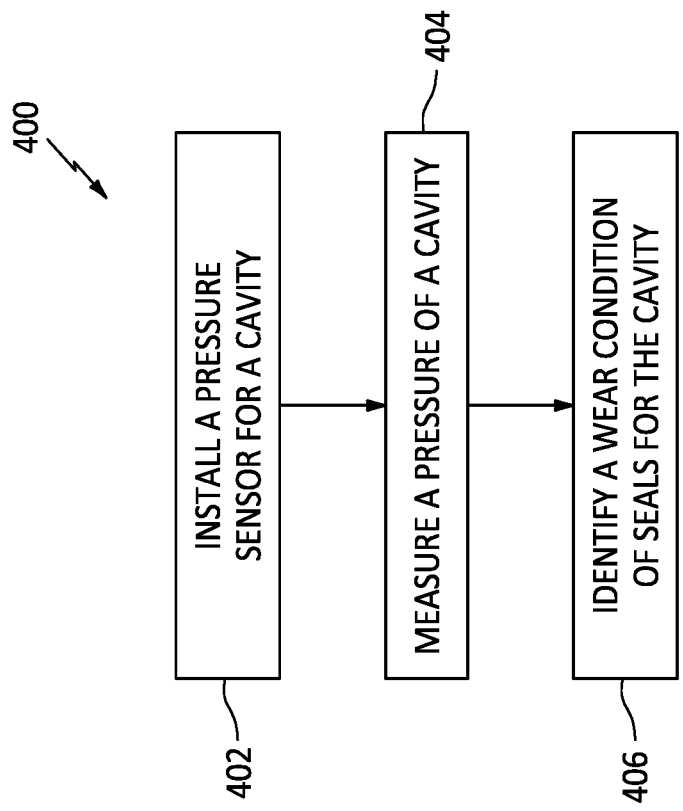
FIG. 4 illustrates a flowchart depicting a method for identifying a condition of seals for a gas turbine engine, in accordance with one or more embodiments of the present disclosure.

Referring to FIGS. 2-4, a Method 400 for identifying a wear condition of seals for a gas turbine engine is provided. FIG. 4 illustrates a flowchart for the Method 400. The Method 400 may be performed for the gas turbine engine 20 and frame seals 94 described herein. The Method 400 may be performed, for example, with the propulsion system 10 and its gas turbine engine 20 in an "on-wing" condition (e.g., installed on the aircraft 1000, see FIG. 1). Further, the engine control system 24 and the one or more remote systems 78 described herein may be used to execute or control one or more steps of the Method 400. For example, the processor 72 may execute instructions stored in memory 74, thereby causing the engine control system 24 and/or its processor 72 to execute or otherwise control one or more steps of the Method 400. Similarly, the processor 140 may execute instructions stored in memory 142, thereby causing the remote system 78 and/or its processor 140 to execute or otherwise control one or more steps of the Method 400. However, while the Method 400 may be described herein with respect to the gas turbine engine 20, the engine control system 24, and/or the remote systems 78, the present disclosure Method 400 is not limited to use with the gas turbine engine 20, the engine control system 24, and/or the remote systems 78. Moreover, the present disclosure Method 400 is not limited to monitoring the mid-turbine frame seals (e.g., the frame seals 94) and may alternatively be used for monitoring other seals and seal configurations as well. Unless otherwise noted herein, it should be understood that the steps of Method 400 are not required to be performed in the specific sequence in which they are discussed below and, in some embodiments, the steps of Method 400 may be performed separately or simultaneously.

Figure 5:
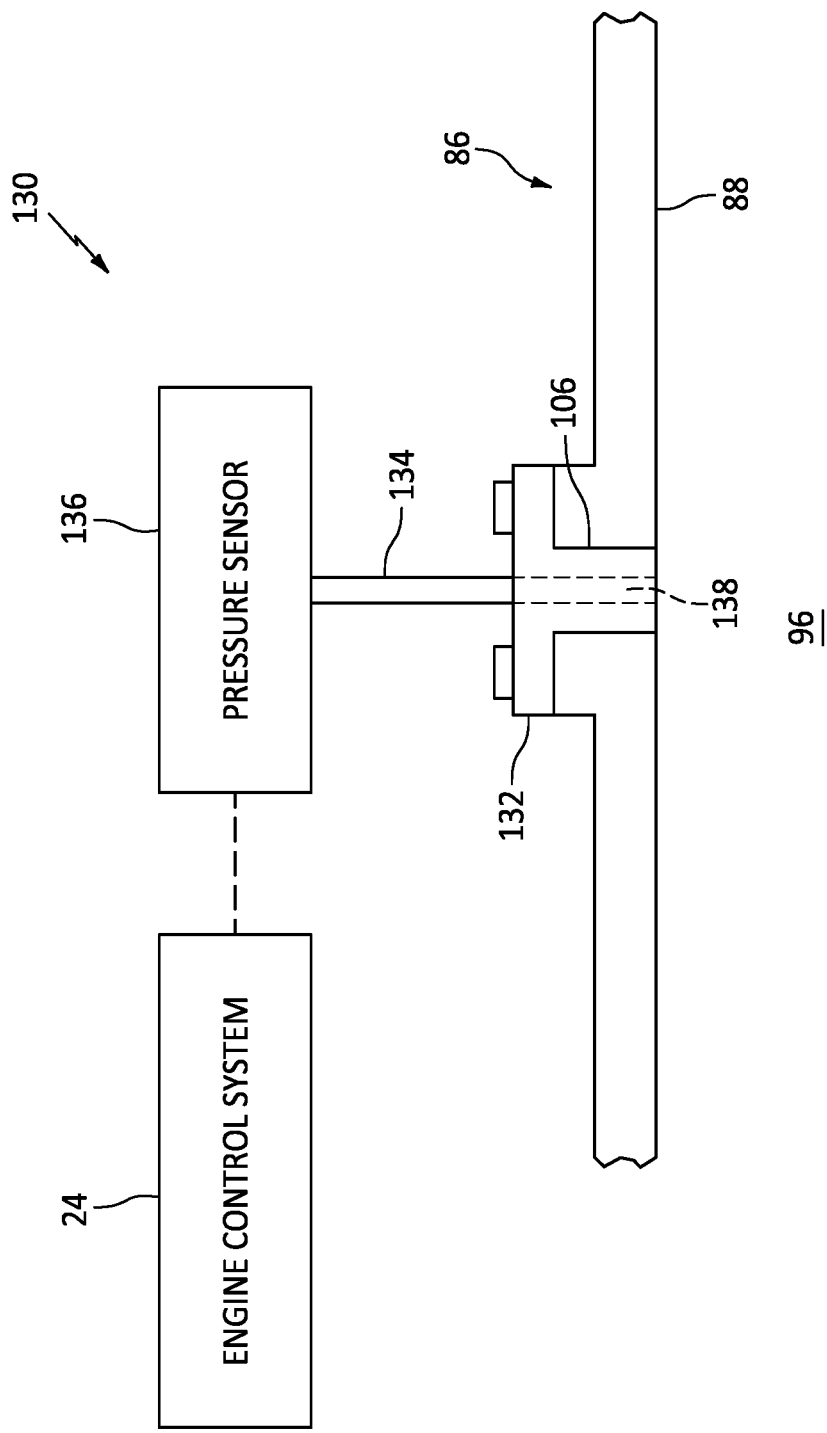
FIG. 5 illustrates a test pressure assembly for the mid-turbine frame of FIG. 3, in accordance with one or more embodiments of the present disclosure.

In Step 402, a pressure sensor may be installed at (e.g., on, adjacent, or proximate) the mid-turbine frame 86. The pressure sensor may be installed to measure a pressure of the mid-turbine frame cavity 96, for example, where the mid-turbine frame 86 does not include a dedicated pressure sensor (e.g., the pressure sensor 76I of FIG. 3). FIG. 5 illustrates a test pressure assembly 130 for the mid-turbine frame 86. The test pressure assembly 130 may be used to measure a pressure within the mid-turbine frame cavity 96, for example, during a grounded condition of the aircraft 1000 (see FIG. 1). The test pressure assembly 130 may include a pressure sensor which can be inserted into or in fluid communication with the mid-turbine frame cavity 96 through an opening (e.g., an opening in the turbine case assembly 80 such as the outer case 88 or the inner case 90). For example, the test pressure assembly 130 of FIG. 5 includes a borescope plug 132, a conduit 134, and a pressure sensor 136. The borescope plug 132 may have a size, shape, and/or configuration which is similar to that of the borescope plug 112 of FIG. 3, such that the borescope plug 132 may be installed in the borescope port 106 of the outer case 88. The borescope plug 132 may form an interior passage 138 in fluid communication with the mid-turbine frame cavity 96 (e.g., the outer plenum 102). The conduit 134 may fluidly couple the interior passage 138 and the pressure sensor 136, such that the pressure sensor 136 may measure a pressure within the mid-turbine frame cavity 96.

The pressure sensor 136 of FIG. 5 is in signal communication with the engine control system 24. The pressure sensor 136 may provide a pressure signal to the engine control system 24, which pressure signal is representative of a measured pressure of the mid-turbine frame cavity 96. Because the test pressure assembly 130 may be a temporarily installed assembly used during maintenance and testing of the gas turbine engine 20, the engine control system 24 may not be configured to recognize and/or identify the pressure signal from the pressure sensor 136. In some cases, the Step 402 may include connecting the pressure sensor 136 in signal communication with the engine control system 24 by connecting the pressure sensor 136 to an input of the engine control system 24, which input is associated with another pressure sensor (e.g., pressure sensors 76A, 76C, 76I, etc.) of the gas turbine engine 20, thereby replacing another pressure sensor as an input to the engine control system 24. The engine control system 24 may transmit (e.g., wirelessly transmit) the pressure signal from the pressure sensor 136 to the one or more remote systems 78.

In Step 404, the pressure of the mid-turbine frame cavity 96 is measured during operation of the gas turbine engine 20. For example, the pressure of the mid-turbine frame cavity 96 may be measured using the pressure sensor 76I, the test pressure assembly 130, or another suitable pressure measurement assembly in signal communication with the engine control system 24. The pressure measurement signals received by the engine control system 24 (e.g., from the pressure sensor 136) may be recorded by the engine control system 24 (e.g., in memory 74) and/or transmitted to the one or more remote stations 78 for analysis and/or recording (e.g., in memory 142). Step 404 may include post-processing of the recorded and/or transmitted pressure measurement signal data by the engine control system 24 and/or the remote system 78. Post-processing of the pressure measurement signal data may include, for example, data calibration and/or normalization to account for differences in ambient conditions for the gas turbine engine 20 (e.g., ambient pressure, ambient temperature, etc.). The post-processing may, therefore, facilitate comparison of pressure measurement signal data for different gas turbine engines (e.g., different instances of the gas turbine engine 20) in different locations and/or conditions.

Operational conditions for measuring the pressure of the mid-turbine frame cavity 96 may be established manually, for example, by a pilot, technician, or other operator of the gas turbine engine 20. Alternatively, the engine control system 24 may control the gas turbine engine 20 to establish a predetermined operating condition or a series of predetermined operating conditions of the gas turbine engine 20 for measuring the pressure of the mid-turbine frame cavity 96. For example, the engine control system 24 may control the gas turbine engine 20 to establish an operational power level of the gas turbine engine 20 at which the pressure of the mid-turbine frame cavity 96 may be measured. The operational power level of the gas turbine engine 20 may be determined using operational parameters of the gas turbine engine 20 such as, but not limited to, fuel flow, rotation speed of the first shaft 50, and/or rotation speed of the second shaft 56. The engine control system 24 may also control the gas turbine engine 20 to establish series of operational power levels of the gas turbine engine 20 which may be exhibited, for example, as a continuous increase in operational power over time (e.g., an acceleration condition), a continuous decrease in operational power over time (e.g., a deceleration condition), or a series of different, substantially constant operational power levels. The engine control system 24 may monitor one or more operational parameters of the gas turbine engine 20 (e.g., fuel flow, rotation speed of the first shaft 50, and/or rotation speed of the second shaft 56) to verify a steady state condition of the gas turbine engine 20 which may facilitate improved accuracy for measuring the pressure of the mid-turbine frame cavity 96. Operating the gas turbine engine 20 to establish conditions for measuring the pressure of the mid-turbine frame cavity 96 may be performed with the propulsion system 10 and associated aircraft 1000 in flight or on the ground (see FIG. 1). In flight, of course, the operational conditions which may be established (e.g., by the engine control system 24) may be limited to those which are appropriate for the current flight condition of the propulsion system 10 and associated aircraft 1000.

In Step 406, a wear condition of the frame seals 94 is identified using the measured pressure of the mid-turbine frame cavity 96. As described above, the frame seals 94 may experience wear, for example, as a result of gas turbine engine 20 operation, thereby allowing at least some amount of the pressurized air 110 to leak past one or more of the frame seals 94. By measuring the pressure of the mid-turbine frame cavity 96 and correcting for known operational conditions of the gas turbine engine 20, a wear condition (e.g., health) of the frame seals 94 may be identified as a function of the effect of the leakage attributable to the frame seals 94 on the pressure of the mid-turbine frame cavity 96.

Step 406 may include selecting or determining one or more pressure threshold values which may be compared to the measured pressure to identify a wear condition of the frame seals 94. The pressure of the mid-turbine frame cavity 96 may be a function of one or more operational conditions or parameters of the gas turbine engine 20. For example, as discussed above, the mid-turbine frame cavity 96 receives pressurized air 110 from a pressurized air source such as, but not limited to, an outlet (e.g., P3.0 air) or an intermediate stage (e.g., P2.8 or P2.9 air) of the high-pressure compressor 28B. Selection or determination of the one or more pressure threshold values may be based on a measured pressure of the compressor section 28 (e.g., by the one or more pressure sensors 76A), which measured pressure of the compressor section 28 may be representative of a pressure of the pressurized air 110 supplied to the mid-turbine frame cavity 96. For example, selection or determination of the one or more pressure threshold values may be based on the outlet pressure P3.0 of the high-pressure compressor 28B. The pressure threshold values may be predetermined threshold values corresponding to operation conditions of the gas turbine engine 20 such as, but not limited to, the operating conditions established in Step 404. Alternatively, the pressure threshold values may be dynamically determined by the engine control system 24 or the remote system 78 based on one or more operational conditions or measured operational parameters of the gas turbine engine 20. The one or more pressure threshold values may be specific to the particular configuration of the gas turbine engine 20, the frame seals 94, and/or the mid-turbine frame 86, and may be experimentally and/or analytically (e.g., computer modeled) determined for the particular gas turbine configuration of the gas turbine engine 20, the frame seals 94, and/or the mid-turbine frame 86.

The engine control system 24 and/or the remote system 78 may select or determine a first pressure threshold value. The engine control system 24 and/or the remote system 78 may compare one or more values of the measured pressure data for the mid-turbine frame cavity 96 to the first pressure threshold value. A value of the measured pressure data which is less than the first pressure threshold value may cause the engine control system 24 and/or the remote system 78 to identify that an increased wear condition exists for one or more of the frame seals 94. In response to identifying an increased wear condition for the frame seals 94, the engine control system 24 and/or the remote system 78 may generate a notification (e.g., a warning message, a warning light, an audible alarm, etc.) for a pilot, technician, or other operator of the gas turbine engine 20.

The engine control system 24 and/or the remote system 78 may select or determine a second pressure threshold value. The engine control system 24 and/or the remote system 78 may compare one or more values of the measured pressure data for the mid-turbine frame cavity 96 to the second pressure threshold value. A value of the measured pressure data which is less than the second pressure threshold value may cause the engine control system 24 and/or the remote system 78 to identify that the frame seals 94 should be monitored more frequently (e.g., the monitoring periodicity of the frame seals 94 for the particular propulsion system 10 should be increased), for example, due to identified wear of the frame seals 94 which is acceptable for continued operation of the gas turbine engine 20.

The engine control system 24 and/or the remote system 78 may select or determine a third pressure threshold value. The engine control system 24 and/or the remote system 78 may compare one or more values of the measured pressure data for the mid-turbine frame cavity 96 to the third pressure threshold value. A value of the measured pressure data which is less than the third pressure threshold value may cause the engine control system 24 and/or the remote system 78 to identify that the frame seals 94 should be replaced.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Accordingly, the present disclosure is not to be restricted except in light of the attached claims and their equivalents.

The invention claimed is:

1. An assembly for an aircraft propulsion system, the assembly comprising:
 a high-pressure turbine forming a core flow path;
 a low-pressure turbine further forming the core flow path, the low-pressure turbine disposed downstream of the high-pressure turbine;
 a mid-turbine frame disposed between the high-pressure turbine and the low-pressure turbine, the mid-turbine frame including an outer case, an inner case, an inter-turbine duct, and a plurality of frame seals, the outer case, the inner case, the inter-turbine duct, and the plurality of frame seals forming a mid-turbine frame cavity of the mid-turbine frame, the plurality of frame seals configured to seal the mid-turbine frame cavity, the inter-turbine duct further forming the core flow path;
 a pressurized air source fluidly coupled to the mid-turbine frame, the pressurized air source configured to direct pressurized air into the mid-turbine frame cavity;
 a first pressure sensor in fluid communication with the mid-turbine frame cavity, the first pressure sensor configured to measure a first pressure within the mid-turbine frame cavity; and
 an engine control system connected in signal communication with the first pressure sensor, the engine control system including a processor in communication with a non-transitory memory storing instructions which, when executed by the processor, cause the processor to:
  measure the first pressure using the first pressure sensor; and identify a presence or an absence of an increased wear condition of the plurality of frame seals by comparing the first pressure to a pressure threshold value, the presence of the increased wear condition identified where the first pressure is less than the pressure threshold value.

2. The assembly of claim 1, further comprising a high-pressure compressor further forming the core flow path, the pressurized air source including the high-pressure compressor.

3. The assembly of claim 1, wherein the pressurized air source is disposed outside the aircraft propulsion system.

4. The assembly of claim 1, further comprising a second pressure sensor configured to measure a second pressure of the pressurized air at the pressurized air source, the second pressure sensor connected in signal communication with the engine control system.

5. The assembly of claim 4, wherein the instructions, when executed by the processor, further cause the processor to:
measure the second pressure using the second pressure sensor; and
determine the pressure threshold value based on the second pressure.

6. The assembly of claim 1, wherein the outer case includes a borescope port, the assembly further comprising a borescope plug installed in the borescope port, the borescope plug forming an internal passage in fluid communication with the mid-turbine frame cavity, the first sensor disposed outside the mid-turbine frame cavity and fluidly coupled to the internal passage to measure the first pressure within the mid-turbine frame cavity.

7. The assembly of claim 1, wherein the inter-turbine duct includes an outer duct wall, an inner duct wall, and a plurality of hollow struts extending from the outer duct wall to the inner duct wall, the outer duct wall, the inner duct wall, and the plurality of hollow struts further forming the mid-turbine frame cavity.

8. The assembly of claim 1, wherein the mid-turbine frame is configured to direct the pressurized air from the mid-turbine frame cavity to the low-pressure turbine.

9. An assembly for an aircraft propulsion system, the assembly comprising:
a high-pressure turbine forming a core flow path;
a low-pressure turbine further forming the core flow path, the low-pressure turbine disposed downstream of the high-pressure turbine;
a mid-turbine frame disposed between the high-pressure turbine and the low-pressure turbine, the mid-turbine frame including an outer case, an inner case, an inter-turbine duct, and a plurality of frame seals, the outer case, the inner case, the inter-turbine duct, and the plurality of frame seals forming a mid-turbine frame cavity of the mid-turbine frame, the plurality of frame seals configured to seal the mid-turbine frame cavity, the inter-turbine duct further forming the core flow path;
a pressurized air source fluidly coupled to the mid-turbine frame, the pressurized air source configured to direct pressurized air into the mid-turbine frame cavity;
a first pressure sensor in fluid communication with the mid-turbine frame cavity, the first pressure sensor configured to measure a first pressure within the mid-turbine frame cavity;
an engine control system connected in signal communication with the first pressure sensor; and
a remote system disposed outside of the aircraft propulsion system, the remote system configured for signal communication with the engine control system, the remote system including a processor in communication with a non-transitory memory storing instructions which, when executed by the processor, cause the processor to:
receive the first pressure from the engine control system; and
identify a presence or an absence of an increased wear condition of the plurality of frame seals by comparing the first pressure to a pressure threshold value, the presence of the increased wear condition identified where the first pressure is less than the pressure threshold value.

10. The assembly of claim 9, further comprising a high-pressure compressor further forming the core flow path, the pressurized air source including the high-pressure compressor.

11. The assembly of claim 9, wherein the pressurized air source is disposed outside the aircraft propulsion system.

12. The assembly of claim 9, further comprising a second pressure sensor configured to measure a second pressure of the pressurized air at the pressurized air source, the second pressure sensor connected in signal communication with the engine control system.

13. The assembly of claim 12, wherein the instructions, when executed by the processor, further cause the processor to:
receive the second pressure from the engine control system; and
determine the pressure threshold value based on the second pressure.

14. The assembly of claim 9, wherein the outer case includes a borescope port, the assembly further comprising a borescope plug installed in the borescope port, the borescope plug forming an internal passage in fluid communication with the mid-turbine frame cavity, the first sensor disposed outside the mid-turbine frame cavity and fluidly coupled to the internal passage to measure the first pressure within the mid-turbine frame cavity.

15. An assembly for an aircraft propulsion system, the assembly comprising:
a high-pressure turbine forming a core flow path;
a low-pressure turbine further forming the core flow path, the low-pressure turbine disposed downstream of the high-pressure turbine;
a mid-turbine frame disposed between the high-pressure turbine and the low-pressure turbine, the mid-turbine frame including an outer case, an inner case, an inter-turbine duct, and a plurality of frame seals, the outer case, the inner case, the inter-turbine duct, and the plurality of frame seals forming a mid-turbine frame cavity of the mid-turbine frame, the outer case including a borescope port, the plurality of frame seals configured to seal the mid-turbine frame cavity, the inter-turbine duct further forming the core flow path;
a pressurized air source fluidly coupled to the mid-turbine frame, the pressurized air source configured to direct pressurized air into the mid-turbine frame cavity;
a borescope plug installed in the borescope port, the borescope plug forming an internal passage through the borescope plug, the internal passage in fluid communication with the mid-turbine frame cavity;
a first pressure sensor disposed outside the mid-turbine frame cavity and fluidly coupled to the internal passage, the first pressure sensor configured to measure a first pressure within the mid-turbine frame cavity through the internal passage.

16. The assembly of claim 15, further comprising an engine control system connected in signal communication with the first pressure sensor, the engine control system including a processor in communication with a non-transitory memory storing instructions which, when executed by the processor, cause the processor to:
  measure the first pressure using the first pressure sensor; and
  identify a presence or an absence of an increased wear condition of the plurality of frame seals by comparing the first pressure to a pressure threshold value, the presence of the increased wear condition identified where the first pressure is less than the pressure threshold value.

17. The assembly of claim 16, further comprising a second pressure sensor configured to measure a second pressure of the pressurized air at the pressurized air source, the second pressure sensor connected in signal communication with the engine control system.

18. The assembly of claim 17, wherein the instructions, when executed by the processor, further cause the processor to:
  measure the second pressure using the second pressure sensor; and
  determine the pressure threshold value based on the second pressure.

19. The assembly of claim 16, further comprising a high-pressure compressor further forming the core flow path, the pressurized air source including the high-pressure compressor.

20. The assembly of claim 16, wherein the pressurized air source is disposed outside the aircraft propulsion system.

* * * * *